US011288523B2

(12) United States Patent
Clothier et al.

(10) Patent No.: US 11,288,523 B2
(45) Date of Patent: Mar. 29, 2022

(54) PSEUDO-RANGE ESTIMATION FROM A PASSIVE SENSOR

(71) Applicant: The Boeing Company, Chicago, IL (US)

(72) Inventors: Reece Alexander Clothier, Melbourne (AU); Brendan Patrick Williams, Brisbane (AU); Solene Gabrielle Doreen Hegarty-Cremer, Brisbane (AU)

(73) Assignee: THE BOEING COMPANY, Chicago, IL (US)

( * ) Notice: Subject to any disclaimer, the term of this patent is extended or adjusted under 35 U.S.C. 154(b) by 288 days.

(21) Appl. No.: 16/143,866

(22) Filed: Sep. 27, 2018

(65) Prior Publication Data

US 2020/0104609 A1 Apr. 2, 2020

(51) Int. Cl.
*G06K 9/00* (2006.01)
*G01C 3/08* (2006.01)

(52) U.S. Cl.
CPC ........... *G06K 9/00805* (2013.01); *G01C 3/08* (2013.01)

(58) Field of Classification Search
None
See application file for complete search history.

(56) References Cited

U.S. PATENT DOCUMENTS

| 7,876,258 B2* | 1/2011 | Abraham | G08G 5/045 342/29 |
| 8,781,721 B2 | 7/2014 | Dowdall et al. | |
| 9,291,716 B2* | 3/2016 | Hadef | G01S 19/36 |
| 9,342,746 B1* | 5/2016 | Ganguli | G06K 9/3241 |
| 9,664,770 B2* | 5/2017 | Beutler | G01S 5/0278 |
| 2011/0134249 A1* | 6/2011 | Wood | G02B 26/101 348/164 |

OTHER PUBLICATIONS

Devin Soni, "What is Bayes Rule?", May 10, 2018, towards data science, downloaded from internet at https://towardsdatascience.com/what-is-bayes-rule-bb6598d8a2fd (Year: 2018).*

(Continued)

*Primary Examiner* — Eman A Alkafawi
*Assistant Examiner* — Denise R Karavias
(74) *Attorney, Agent, or Firm* — Coats & Bennett, PLLC (57) ABSTRACT

A rough initial estimate of Line of Sight range ("pseudo-range") is generated essentially immediately following the detection of an object by a passive sensor on a vehicle. The data are combined with prior detection likelihood and prior performance models for the sensor. These comparisons generate a posterior probability distribution of pseudo-range estimates. A pseudo-range estimate is derived from the probability distribution and output for use in detect and avoid decision-making and action planning. The pseudo-range estimate can be updated to improve its accuracy, such as by using a recursive filter (e.g., a Kalman filter). Other information, such as current atmospheric data, or known (or likely) vehicular activity in the region and at the current time, can be used in addition to the vehicle's spatial and temporal location, to improve accuracy.

20 Claims, 3 Drawing Sheets

(56) References Cited

OTHER PUBLICATIONS

Delage, E. et al., "A dynamic Bayesian network model for autonomous 3d reconstruction from a single indoor image", Proceedings of the 2006 IEEE Computer Society Conference on Computer Vision and Pattern Recognition, Jun. 17, 2006, pp. 2418-2428, vol. 2.
Chaabani, H. et al., "A Neural network approach to visibility range estimation under foggy weather conditions", Procedia Computer Science, Sep. 19, 2017, pp. 466-471.

* cited by examiner

PSEUDO-RANGE ESTIMATION FROM A PASSIVE SENSOR

TECHNICAL FIELD

The present disclosure relates generally to vehicles, and in particular to a system and method of estimating a pseudo-range from a passive sensor to a detected but unknown object.

BACKGROUND

Advances in real-time software, sensor technology, sensor fusion, and the like have not only made autonomous vehicle operation a reality, but actually (on average) an improvement over human operation. Research and development are ongoing to bring autonomous operation to a wide variety of vehicles, including surface vehicles, aircraft, trains, ships, submarines, spacecraft, and the like.

The ability to detect—and in many cases, to avoid—vehicles or other objects in the environment is a common requirement for automating the operation of many types of vehicles. This detect and avoid (DAA) capability is particularly acute for autonomous aircraft—commonly known as "drones"—which must be able to detect and avoid other aircraft and potential collision objects during both flying and surface movement phases of operation.

Once an autonomous vehicle performs the "detect" part of DAA, a piece of information critical to the "avoid" part is the Line of Sight (LoS) range, or distance, to the detected object. Active range-finding techniques are well known, such as RADAR and LIDAR. Active systems emit electromagnetic (EM) radiation, and through a range of signal processing techniques, determine an estimate of the range to a target using the reflected emitted radiation.

Active range-finding systems are large and complex, and require significant power, both for the EM transmitter and for the processing circuitry required to process the signals and calculate the range. In applications where weight and power are at a premium, range detection using passive sensors is desirable. Further, active emitting systems effectively broadcast the position of the aircraft, which may be undesirable for Defense, law enforcement, or civil security applications. As used herein, a passive sensor is one that detects a physical property, without transmitting any signal. Passive sensors can detect electromagnetic radiation in any part of the spectrum, including visible light, infrared, radio frequency (RF), or the like. Passive sensors also include those detecting audible or ultrasonic sound, or in general any discernable physical property that indicates the presence of an unknown object, such as another vehicle.

Several techniques of range detection using passive sensors are known in the art. The majority of existing solutions require: the processing of target information over multiple frames; additional hardware (i.e., the installation of multiple sensors); an image of the detected object with discernable characteristics (e.g., a measurable number of pixels along particular dimensions, return signal intensity, resolvable features, etc.); or multiple images of the object from different geometries and/or times (e.g., maneuvering of the autonomous vehicle to create an artificial baseline between images, nodding of a sensor, etc.). Each of these approaches exhibit deficiencies that limit their utility for DAA in autonomous vehicles, particularly light aircraft.

Model-based approaches to passive range detection exploit some discernable and measurable characteristic of the detected target, such as pixel counts as estimates of wing span or fuselage size, colors, patterns, identification markings, or other resolvable features such as the number of engines. These features are compared to known characteristics of likely aircraft and other objects in order to determine an estimate of the range. Such approaches have the potential to provide instantaneous measures of range and generally do not require additional sensors. A disadvantage of approaches that rely on discernable characteristics of the target is that, for all but a few potential encounter geometries, discernable features of the detected object are typically not resolvable until well after initial detection. As a consequence, accurate range estimates may not be available with sufficient time for decision-making and avoidance action to take place. The model-based approach is also sensitive to noise/error in the estimation of features (e.g., pixel counts, area, lengths of dimensions, etc.), which generally degrades with increasing range. Additionally, the model-based approach relies on assumed characteristics of the target (model), which may not be correct for a given object encountered, leading to errors in range estimation. Range measurement at appreciable distance requires higher resolution sensors, which come at the expense of reduced field of view. Multiple sensors are often required to cover a minimum effective field of regard, adding to the size, weight, drag, and power demands of the DAA system. Higher resolution sensors also require the use of more sophisticated image stabilization techniques.

One variation of the model-based approach measures the rate of growth in some discernable characteristic of the target image or signal (e.g., pixel area, dimension, contrast, return intensity, etc.) and compares this to an assumed model of the rate, as a function of distance or time to closest point of approach, which can be used to estimate range to the object. The growth-rate approach suffers from the same issues as other techniques that rely on the tracking of discernable characteristics of the target. Additionally, the apparent growth of discernable features typically follows an exponential profile, which leads to the range estimates that occur too late in the closure scenario to be useful for DAA. The approach is also sensitive to noise/error in the estimation of features (e.g., pixel counts, area, lengths of dimensions, etc.), which generally degrades with increasing range. The approach relies on an assumed growth model, which in turn assumes certain characteristics of the target aircraft; hence, the detected range depends on the accuracy of the initial classification of the detected object.

A well-known approach to estimating range is through the use of multiple spatially-distributed sensors, known in the art as stereo-sensing. Working in much the same manner as human eyes, the range to a target is determined from the disparity (difference image) generated between two or more images of a single target. Ranging performance is limited by the size and geometry of the baselines separating the sensors, accuracy of the time synchronization of images, and the ability to stabilize images against vibration and the like. This approach requires the installation of multiple sensors at spatially distributed locations on the autonomous vehicle, which adds drag and weight, increases power consumption, and reduces available payload volume. Ranging accuracy is proportional to the size of the baseline between successive images.

Another approach to range detection, similar to stereo-sensing, is motion baseline sensing. In this approach, sensor motion (either through maneuvering of the autonomous vehicle or the sensor itself) can be used to provide multiple observations of the detected object from different relative poses. Similar image processing (as used in stereo-sensing)

is then applied to ascertain a range estimate of the target. Motion baseline methods rely on accurate tracking of the sensor position and pose (or their estimation through filtering) between images to generate range estimates. A model of the target aircraft motion (between observations) is also required. Accuracy is proportional to the size of the baseline between successive images and the accuracy of the target aircraft motion model. One significant disadvantage of this approach is the additional time taken to collect and process multiple images from sufficiently different poses. Instantaneous estimates of range are not possible, and the time taken to maneuver reduces the time available to process the situation and take avoiding action.

Another approach to passive ranging utilizes motion parallax, obscuration, and relative sizing. This approach is based on comparing the size, position, and/or motion of the detected object with other objects of a known size and/or distance from the sensor. Additionally, the degree of overlapping or obscuration of the target by other objects, which are at known ranges, can also be used to estimate the range to the target.

Parallax and obscuration based approaches, although conceptually feasible, are not likely to be practical for DAA for autonomous light aircraft, as they require multiple "known and ranged" objects in the same scene as (or in proximity to) the detected target of interest. These approaches are likely to be less accurate than other ranging approaches, providing "order of magnitude" estimates at best. These approaches are most suitable for DAA systems used during surface operations, such as taxiing.

Known approaches to range estimation using passive sensors exhibit numerous deficiencies. The need for multiple sensors in stereo-sensing adds weight, drag, and power consumption to the autonomous vehicle. The need for sensor movement—whether independently or by moving the vehicle—adds further complication, and is too slow to be useful for DAA. Model-based, growth rate, and similar approaches depend on early target classification and comparison to a stored model—errors in the initial classification can be detrimental to accurate range estimation. Also, these approaches can yield a range estimate too late for use in DAA. Parallax and obscuration based approaches depend on operation in an environment with known reference objects, which in general is unlikely to occur during autonomous vehicle operation.

Accordingly, a range estimation technique using a single (or a few) passive sensor(s), which yields an immediate estimate of range, that does not depend on target feature detection or classification of the target, would represent a significant advancement in the state of the art.

The Background section of this document is provided to place aspects of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of aspects of the disclosure or to delineate the scope of the disclosure. The sole purpose of this summary is to present some concepts disclosed herein in a simplified form as a prelude to the more detailed description that is presented later.

According to one or more aspects described and claimed herein, a pseudo-range is estimated following the detection of an object by a passive sensor (a "pseudo-range" is a rough, or known inaccurate, estimate of actual range). Detection data from the sensor are combined with prior performance models for the sensor. These comparisons generate a posterior probability distribution of pseudo-range estimates, or a set of such distributions. A single pseudo-range estimate is derived from the probability distribution and output for use in DAA decision-making and action planning. For example, the most likely pseudo-range estimate can be selected, or the worst-case one. The pseudo-range estimate, while not necessarily of high accuracy, is generated essentially immediately upon detection of an object by the passive sensor. The pseudo-range estimate can be updated to improve its accuracy, such as by using a recursive filter (e.g., a Kalman filter). The pseudo-range estimate can also be improved using one or more known passive ranging methods. Combining the sensor detection with prior performance models for the sensor can comprise using Bayesian techniques to combine the sensor detection and the vehicle spatial and temporal location with a prior probability distribution describing uncertainty in sensor detection as a function of pseudo-range to a detected object. Establishing a plurality of pseudo-range estimates can comprise establishing a Bayesian posterior distribution of pseudo-range to an unknown object at the time of initial detection. Other information, such as current atmospheric data, or known (or likely) vehicular activity in the region and at the current time, can be used in addition to the vehicle's spatial and temporal location, in either or both of the comparison with prior performance models, and the derivation of a pseudo-range estimate from the posterior probability distribution.

One aspect relates to a method of estimating a pseudo-range to a detected, unknown object, from a vehicle having a passive sensor. An indication of detection of an object is received from the passive sensor. One or more probability distributions of pseudo-range estimates is established by combining sensor detection data with prior detection likelihood and prior performance models for the sensor. An estimate of the pseudo-range to the detected, unknown object is derived from the one or more probability distributions of pseudo-range estimates. The estimated pseudo-range to the detected, unknown object is output.

Another aspect relates to a pseudo-range estimating apparatus adapted to estimate a pseudo-range to a detected, unknown object from a vehicle having a passive sensor. The apparatus includes stored prior performance models for the sensor, memory, and processing circuitry. The processing circuitry is operatively connected to the memory, and is operative to receive the prior performance models. The processing circuitry is adapted to: receive, from the passive sensor, data indicating detection of an object; establish one or more probability distributions of pseudo-range estimates by combining sensor detection data with prior detection likelihood and prior performance models for the sensor; derive, from the one or more probability distributions of pseudo-range estimates, an estimate of the pseudo-range to the detected, unknown object; and output the estimated pseudo-range to the detected, unknown object.

BRIEF DESCRIPTION OF THE DRAWINGS

The present disclosure will now be described more fully hereinafter with reference to the accompanying drawings, in which aspects of the disclosure are shown. However, this disclosure should not be construed as being limited to the aspects set forth herein. Rather, these aspects are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the aspects of the present disclosure can be practiced without limitation to these specific details. In this description, well known methods and structures have not been described in detail so as not to unnecessarily obscure the present disclosure.

As used herein, the terms "pseudo-range," and "pseudo-range estimate" mean an initial, rough estimate of LoS range, or distance, from the sensor to an object, rendered essentially immediately upon detection of the object by a passive sensor. The modifier "pseudo" indicates that the pseudo-range estimate is insufficiently accurate for, e.g., detailed flight planning. However, the pseudo-range estimate is generally sufficiently accurate to initiate a DAA process. "Essentially immediately" means that, following receipt of an indication of detection of an object, a pseudo-range estimate is generated after the delay of only a few memory accesses and computational operations. Given the processing speed of modern processors and DSPs, such a brief delay is essentially immediate as compared to known passive detection systems, which can require extensive processing time to track a target over multiple frames of images or to track the growth of detected characteristics, or can incur the delay of moving the vehicle to generate different sensor views. The initial detection of an object by the sensor (or circuits processing the sensor output) is, in general, simply a binary indication that an object exists. At this stage, nothing specific is known about the object—such as size, features, color, etc. Accordingly, the initially detected object is referred to herein as a "detected, unknown object"—it has been detected, but its classification or identity is unknown.

The pseudo-range estimation process of aspects of the present disclosure is modeled on the way human pilots intuitively, and based on experience, make initial estimates of range upon visually detecting aircraft, birds, and other objects in their airspace. This process involves the application of experience, stored in the pilots' memory, using heuristics that are also generated and refined through experience. The primary factors used in establishing an initial pseudo-range estimate are the position of a sensor-carrying aircraft, the position of the detected object (e.g., another aircraft, etc.) and the time of day.

As one non-limiting example, a pilot flying at 3,000 ft. altitude, near a small, non-towered airport, may visually detect a "glint," or a reflection of sunlight from some unknown object in nearby airspace. However, due to its distance, relative geometry, atmospheric visibility, or the like, the pilot cannot clearly see the object or make out its features. Initially, the pilot would classify the glint as an aircraft, as in his or her experience, birds do not generate such reflections. Because of the spatial location—near a small airport and at a relatively low altitude—the pilot could further assume the aircraft is most likely a small, piston aircraft. Based on prior experience (encoded as an implicit model of his or her own detection performance), the pilot knows that such an aircraft would be clearly visible within −2 miles, and difficult or impossible to see beyond −6 miles, and hence may assume a likely range of 2-6 miles. In contrast, the same pilot flying at 12,000 ft. near a major airport in class B airspace would likely interpret a similar visual glint as most likely being a commercial jet aircraft, with much different visibility characteristics, and hence would assume a larger pseudo-range to the object. Pilots instinctively and often sub-consciously use other available information in making these initial pseudo-range estimations. For example, the current atmospheric visibility will impact the distance at which a pilot knows he or she could detect airplanes of various sizes, and he or she would adjust the pseudo-range estimate accordingly. Similarly, knowledge of known activity, such as training operations at a military base, or an airshow at a nearby airport, are inherently taken into account by human pilots in estimating a pseudo-range to detected, but unknown, objects. Of course, not all factors described above are explicitly considered by pilots at the time of performing range estimates to targets. Further, and depending on the proximity of the target at time of first visual detection, a pilot may not follow a considered or deliberative range analysis process. Rather, an automatic response based on coarse visual data can be all that is used by a pilot to initiate avoidance action.

According to aspects of the present disclosure, a similar reasoning process is applied, by processing circuitry in an autonomous vehicle, upon an indication of detection of an object by a passive sensor. For any particular type/size/sensitivity of sensor (e.g., visible light, IR, UV, etc.), a number of prior performance models are developed, or captured from actual testing. For each of a range of possible objects, a prior performance model relates LoS range from the sensor to the object, under specific conditions (e.g., location, time, atmospheric conditions, etc.). These are encoded as prior probability and likelihood distributions. These prior performance models are stored and available, such as in a database, (e.g., a database implemented within a Bayesian Belief Network), or by training a neural network.

Immediately upon an indication by the passive sensor of detection of an object (and without further detail, such as discernable features of the object), a Bayesian updating process is used to combine a detection with the assumed likelihood or sampling model with prior (past) performance models for the sensor, to determine a posterior probability distribution of pseudo-range estimates for an assumed target type and set of encounter conditions. In general, additional information, such as current atmospheric conditions or known patterns of activity in the area, time of day, etc. can also be considered as parameters in the likelihood model or as marginal probabilities (encounter conditions). In general, by assuming different target types and encounter conditions, this process results in a set of pseudo-range probability distributions—one for each different (likely) target type and condition.

In one aspect, Bayesian probability theory is exploited to generate a posterior probability distribution (or set of such distributions) of pseudo-range estimates based on the comparison of current conditions with prior performance models. Bayesian probability is a mathematical technique to make decisions based on incomplete or imperfect information. When information is not available, the Bayesian approach makes mathematical assumptions about its likely content. As that information is gathered and disseminated, the Bayesian approach corrects or replaces the assumptions and alters its decision-making accordingly.

More formally, the Bayesian inference technique combines a prior probability distribution of an uncertain quantity (e.g., the pseudo-range to a detected object), with a likelihood function (e.g., prior performance models for specific target types and conditions, such as spatial and temporal location, atmospheric conditions, and the like), to generate a posterior probability distribution of the uncertain quantity (i.e., pseudo-range), given the information derived from the comparison.

Various mathematical techniques can be used to derive an estimate of the LoS range from the output posterior pseudo-range probability distribution(s). For example, the most likely pseudo-range can be selected, or the worst-case (generally, the closest) one. Past models describing the closure rate to the detected object, and/or a recursive filter such as a Kalman filter, can then be used to provide updates to the pseudo-range estimate, if required. In some aspects, prior art ranging techniques can also be employed to increase the accuracy of the pseudo-range estimate. As described herein, these can require the use of alternative or additional sensors, multiple frames of object data, movement of the sensor, or the like, which can require time to develop and process. Meanwhile, the initial pseudo-range estimate can be used by a DAA process to potentially initiate avoidance maneuvers.

In some aspects, as more accurate range information becomes available, the process can update its prior performance models and marginal probabilities, in a similar manner to how human pilots use their experience to enhance their own performance.

Figure 1:
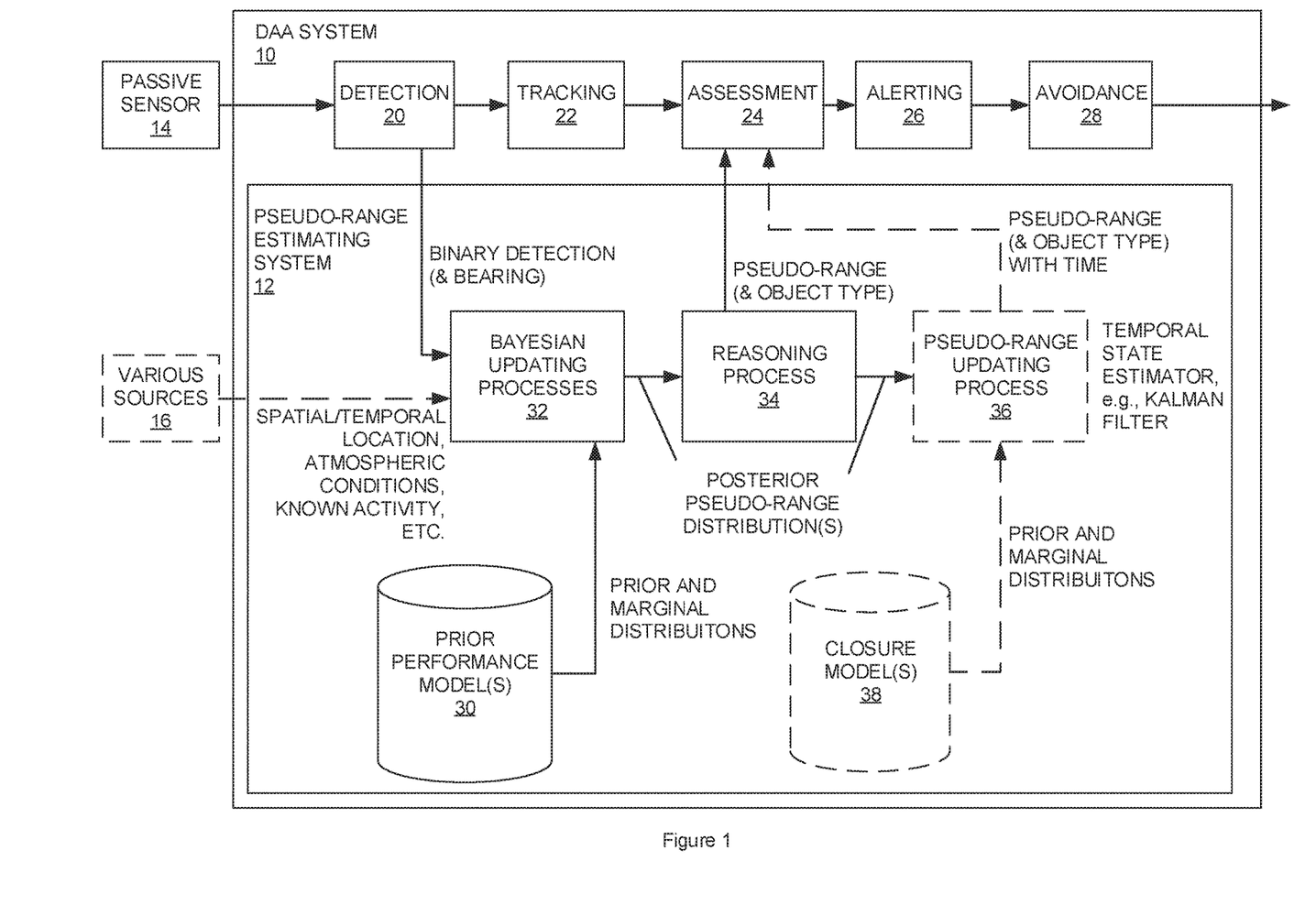
FIG. 1 is a block diagram of a DAA system including a pseudo-range estimating system.

FIG. 1 is a block diagram indicating how the pseudo-range estimation, according to aspects of the present disclosure, can be incorporated into a generic DAA system. A DAA system 10 receives input from a passive sensor 14. The DAA system 10, in general, includes a detection unit 20, a tracking unit 22, an assessment unit 24, an alerting unit 26, and an avoidance unit 28. One or more of the DAA units 20-28 can be implemented as discrete hardware blocks, such as separate processors, field programmable gate arrays, full custom hardware, or the like. Alternatively, one or more of the DAA units 20-28 can be implemented as software modules, executed on one or more processors, digital signal processors (DSP), or the like. In any particular implementation, the functionality of two or more of the DAA units 20-28 can be merged. The DAA units 20-28 perform the functions their names suggest. Briefly, the detection unit 20 monitors an output signal of the passive sensor 14, and detects the presence of an object. The bearing to the detected object is tracked over time by the tracking unit 22. Upon receiving a pseudo-range estimate, the assessment unit 24 assesses the threat of collision or interference with the detected object. If such threat is sufficiently high, the alerting unit 26 generates an alert. Upon the alert, the avoidance unit 28 plans one or more strategies to avoid the object, such as altering the course of the vehicle. In general, DAA functionality is known to those of skill in the art, and not elaborated further herein.

The DAA system 10 also includes a pseudo-range estimating system 12. The pseudo-range estimating system 12 is operative to generate a pseudo-range estimate essentially immediately after detection of an object by the passive sensor 14, as determined by the detection unit 20. The pseudo-range estimating system 12 includes stored prior performance model(s) 30, a Bayesian updating processes unit 32, and a reasoning process unit 34. In some aspects, the pseudo-range estimating system 12 further includes stored closure model(s) 38, and a pseudo-range updating process unit 36. The stored models 30, 38 can be in the form of databases (e.g., a database implemented within a Bayesian Belief Network), or can be loaded into the connectivity of a neural net through training. One or more of the process units 32, 34, 36 can be implemented as discrete hardware blocks, such as separate processors, field programmable gate arrays, full custom hardware, or the like. Alternatively, one or more of the process units 32, 34, 36 can be implemented as software modules, executed on one or more processors, digital signal processors (DSP), or the like. In any particular implementation, the functionality of two or more of the process units 32, 34, 36 can be merged. The functionality of the process units 32, 34, 36, including information input to, and generated as outputs of, each unit 32, 34, 36 is discussed below.

The Bayesian updating processes unit 32 receives, from the passive sensor 14, via the detection unit 20, an indication of detection of an object. In some aspects (as indicated by the parentheses in the language between detection unit 20 and Bayesian updating processes 32 in FIG. 1), the Bayesian updating processes unit 32 can also receive, from the detection unit 20, information about the bearing to the object (that is, its direction relative to the passive sensor 14). In general, the data indicating an object detection is simply a binary indicator—an object has been detected (1) or it has not (0). At this point, no detailed information about the detected object is available, or required for the generation of a pseudo-range estimate. For example, the size, shape, color, or features of the object need not be included in the detection indication. Nor is any information necessary relating to the object's motion over time, or the growth rate of any detectable feature, or any information relating the detected object to known objects in the vicinity. If any such data are available, the system can make use of them, possibly achieving greater accuracy—however, in its broadest aspect, the object detection indication from a passive sensor 14 is simply a binary indication.

The Bayesian updating processes unit 32 receives, from prior performance models 30, prior and marginal probability distributions describing uncertainty in sensor detection as a function of pseudo-range to a detected object. The Bayesian updating processes unit 32 combines the sensor detection with prior performance models 30 for the sensor, and outputs one or more posterior probability distributions of pseudo-range estimates (i.e., in some aspects, it outputs a set of probability distributions, if different target types and conditions are encoded in prior performance models 30). In one aspect, known Bayesian inference techniques and equations are employed in generating the one or more posterior probability distributions.

In some aspects, the Bayesian updating processes unit 32 can also receive, from various sources 16, current atmospheric condition data, such as weather, precipitation, cloud cover, visibility, temperature and due point (indicative of fog), and the like. In these aspects, at least some of the prior performance models 30 also include atmospheric condition information. That is, performance of the passive sensor 14 in varying atmospheric conditions was previously modeled or recorded, and comparison of this past performance data with current atmospheric conditions can yield a more accurate posterior probability distribution(s) of pseudo-range estimates.

In some aspects, the Bayesian updating processes unit 32 can also receive, from various sources 16, information related to known or likely vehicular activity in the region of the vehicle's spatial and temporal location. In some of these aspects, at least some of the prior performance models 30 also include information related to known or likely vehicular activity. That is, performance of the passive sensor 14 in the presence of different levels and types of vehicular activity was previously modeled or recorded, and comparison of this past performance data with current known or likely vehicular activity, as well as the current spatial and temporal location of the passive sensor 14, can yield a more accurate posterior probability distribution of pseudo-range estimates.

Figure 3:
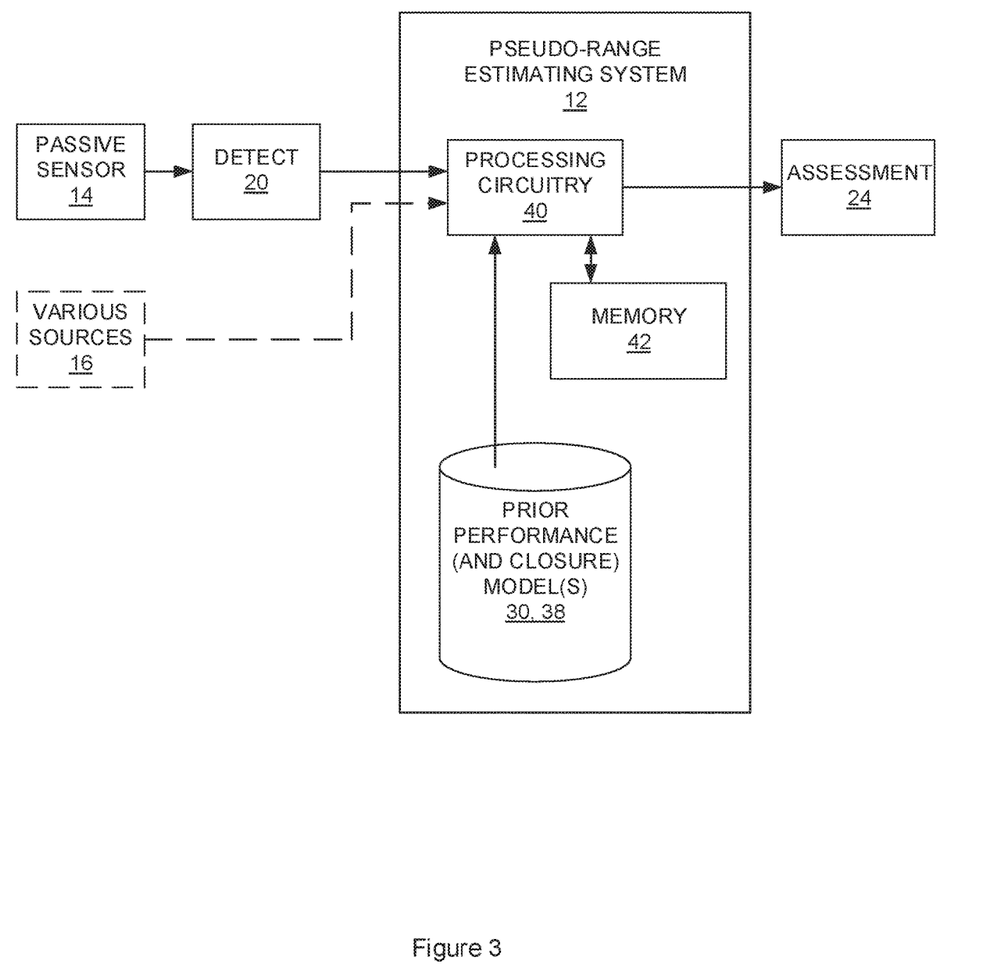
FIG. 3 is a block diagram of an apparatus implementing the pseudo-range estimating system of FIG. 1.

The block representing various sources 16 and its input to the Bayesian update processes unit 32 are depicted with dashed-lines in FIGS. 1 and 3, indicating that these inputs are optional, and not necessary in the broadest formulation of the current disclosure.

For example, an autonomous aircraft may routinely fly near a certain airport in the course of delivering packages or other activity. If a sky-diving school is known to operate from that airport on weekends, then the sensor's detection capability of the specific size or type of aircraft utilized during the sky-diving operations can be modeled or measured, and at least some prior performance models 30 can include that information. In this case, a set of posterior probability distributions of pseudo-range estimates can be obtained—some of them based on the type of aircraft typically used in the sky-diving operation. Based on other available information, such as the spatial and temporal location of the passive sensor 14 (e.g., near the sky-diving activity and on a weekend), and possibly other data such as atmospheric conditions (e.g., sky-diving activity is more likely in sunny weather than in rain), a posterior probability distribution generated using the prior performance model 30 for a sky-diving type aircraft can be determined more likely, and can be selected, yielding a more accurate estimate of pseudo-range. Note that consideration of additional information, such as vehicle location and weather, does not impose significant delay or require accurate characterizations of the detected object. Rather, because the additional information is encoded into some of the prior performance models 30, a set of posterior probability distributions of pseudo-range estimates is generated as quickly (or nearly so) as a single probability distribution would be—the only additional step is selecting one distribution from the set, based on the current location, conditions, or other information.

The posterior probability distribution of pseudo-range estimates (or a set of such distributions) is passed to a reasoning process unit 34, which derives therefrom an estimate of the pseudo-range to the detected, unknown object. This pseudo-range—and in some aspects (as indicated by parentheses in the language between reasoning process 34 and assessment 24), also an indication of the object type—are output to the assessment unit 24. In one aspect, the reasoning process unit 34 derives a pseudo-range estimate by selecting, from the one or more posterior probability distributions, the pseudo-range estimate with the highest probability of being correct. In another aspect, the reasoning process unit 34 selects the worst-case pseudo-range estimate from the one or more posterior probability distributions. In general, the worst-case pseudo-range will be the shortest such estimate. In one aspect (not indicated in FIG. 1), the reasoning process unit 34 also receives at least some information from various sources 16, such as for example, the vehicle location, current atmospheric conditions, and the like. For example, the reasoning process unit 34 can output, from among the one or more posterior probability distributions, the most likely pseudo-range estimate on a sunny day; however, during times of low visibility, the worst case pseudo-range estimate can be output.

In some aspects, as indicated by dashed lines in FIG. 1, the pseudo-range estimate provided to the DAA system 10 can be continuously updated. In these aspects, the reasoning process unit 34 also provides the one or more posterior probability distributions of pseudo-range estimates—which can be continuously changing as inputs to the Bayesian updating processes unit 32 change over time—to a pseudo-range updating process unit 36. The pseudo-range updating process unit 36 applies a temporal state estimator to the posterior probability distribution(s). One example of such a temporal state estimator is a Kalman filter, which is a known tool for predicting the behavior of a dynamic system in the face of uncertain information, based on past behavior. The pseudo-range updating process unit 36 provides updated (i.e., evolving over time) pseudo-range estimates—and in some aspects (as indicated by parentheses in the language between pseudo-range updating process 36 and assessment 24) additionally updated object type estimates—to the assessment unit 24 of the DAA system 10.

Figure 2:
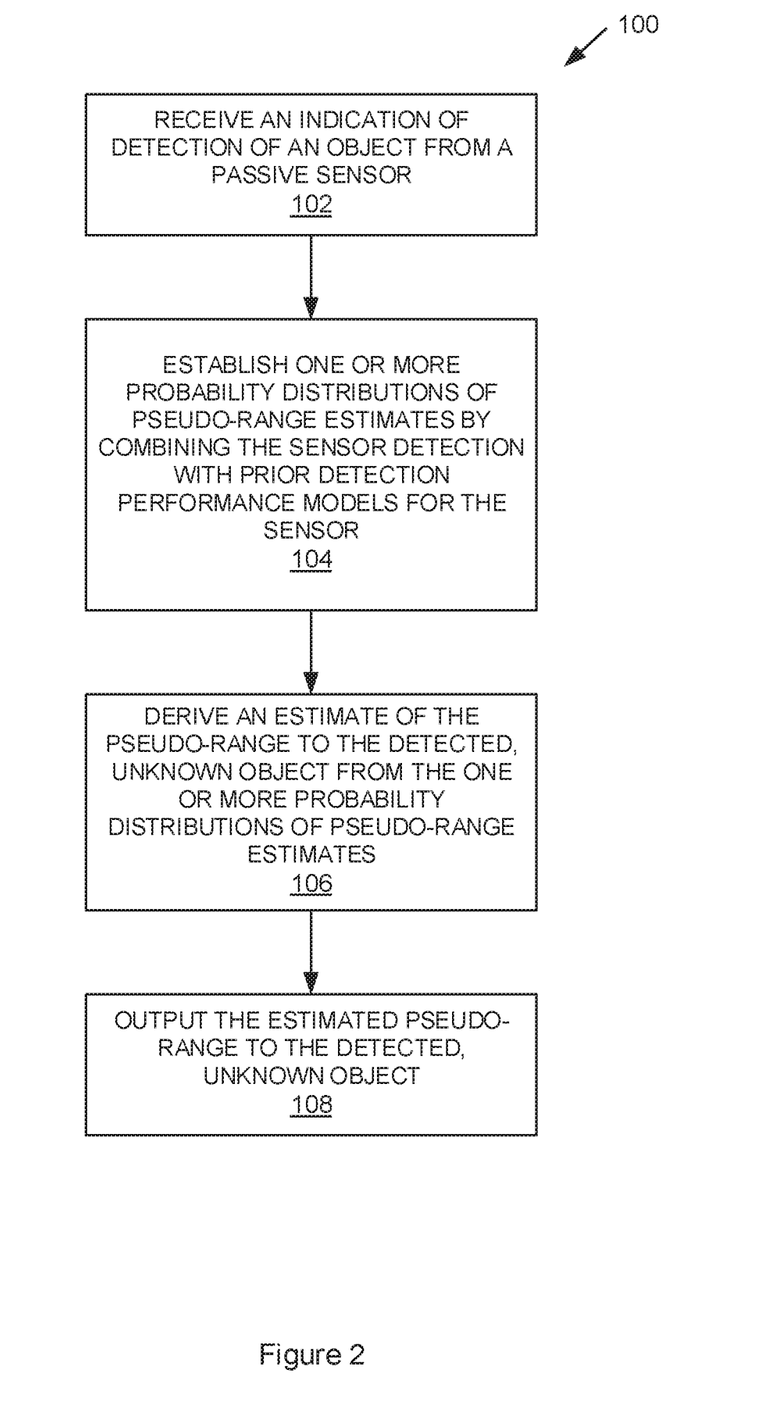
FIG. 2 is a flow diagram of a method of estimating a pseudo-range to a detected, unknown object from a vehicle having a passive sensor.

FIG. 2 depicts a method 100 of estimating a pseudo-range to a detected, unknown object from a vehicle having a passive sensor 14. Data indicating detection of an object is received from the passive sensor 14 (block 102). In one aspect, the data are a binary indication. One or more probability distributions of pseudo-range estimates are established by combining the sensor detection data with the prior detection performance model 30 (block 104). An estimate of the pseudo-range to the detected, unknown object is derived from the one or more probability distributions of pseudo-range estimates (block 106). The estimated pseudo-range to the detected, unknown object is output (block 108), such as to an assessment unit 24 of a DAA system 10. In some aspects (not depicted in FIG. 2), own-aircraft position data (e.g., from a navigation system) can be combined with the pseudo-range estimate to provide an estimate of the location of the target object in a navigation coordinate frame (e.g., latitude, longitude, altitude). The method 100 can provide a pseudo-range to a detected, unknown object, such as for use in a DAA system 10.

In one aspect, deriving, from the one or more probability distributions of pseudo-range estimates, an estimate of the pseudo-range to the detected, unknown object comprises selecting a pseudo-range estimate with a high probability of being correct. This can provide an accurate estimate, for effective DAA operation.

In another aspect, deriving, from the one or more probability distributions of pseudo-range estimates, an estimate of the pseudo-range to the detected, unknown object comprises selecting a worst case pseudo-range estimate. This can ensure that the object is promptly avoided, erring on the side of caution.

In one aspect, combining the sensor detection data with prior performance models 30 for the sensor 14 comprises using Bayesian techniques to combine the sensor detection data with a prior probability distribution describing uncertainty in sensor detection as a function of pseudo-range to a detected object. Furthermore, in one aspect, establishing a probability distribution of pseudo-range estimates comprises establishing a Bayesian posterior probability distribution of pseudo-range to an unknown object at a time of initial detection. This leverages known mathematical techniques to generate a pseudo-range estimate.

In one aspect, the method 100 further comprises receiving current atmospheric condition data, and wherein one or both of the combining and deriving steps further comprises additionally considering the atmospheric condition data. In one aspect, the method 100 further comprises accessing a database of known or likely vehicular activity in a region of the vehicle's spatial and temporal location, and wherein one or both of the combining and deriving steps further comprises additionally considering the vehicular activity. The incorporation of additional environmental conditions or activities can improve the accuracy of a pseudo-range estimate.

In one aspect, the method 100 further comprises updating the estimated pseudo-range to the detected, unknown object by using a temporal state estimator to compare a prior pseudo-range estimate to one or more current probability distributions of pseudo-range estimates. In one aspect, the temporal state estimator further receives prior closure models 28 of range to detected objects. This can provide an increasingly accurate pseudo-range estimate over time.

In one aspect, a probability distribution of pseudo-range estimates is established for an assumed detected object type and environmental conditions. This increases the scope of possible pseudo-range estimates from which to select, and can improve accuracy.

FIG. 3 depicts an apparatus implementing the pseudo-range estimating system 12 of FIG. 1, according to one aspect of the present disclosure. The passive sensor 14 and various sources 16, as well as the object detection unit 20 and assessment unit 24 of the DAA system 10, are depicted to place the pseudo-range estimating system 12 in context. These apparatus and functional units operate as described above with respect to FIG. 1. The pseudo-range estimating system 12 includes processing circuitry 40, memory 42, and at least prior performance models 30. As indicated by parentheses, the pseudo-range estimating system 12 can additionally include closure models 38. The processing circuitry 40 is adapted to implement the method 100. In particular, the processing circuitry 40 is adapted to receive, from the passive sensor, data indicating detection of an object; establish one or more probability distributions of pseudo-range estimates by combining sensor detection data with prior detection likelihood and prior performance models 30 for the passive sensor 14; derive, from the one or more probability distributions of pseudo-range estimates, an estimate of the pseudo-range to the detected, unknown object; and output the estimated pseudo-range to the detected, unknown object. This can provide a DAA system 10 with an essentially instantaneous pseudo-range estimate, from which it can assess a hazard and plan avoidance procedures.

In one aspect, the processing circuitry 40 is adapted to derive, from the one or more probability distributions of pseudo-range estimates, an estimate of the pseudo-range to the detected, unknown object by selecting a pseudo-range estimate with a high probability of being correct. This can provide a more accurate range, for effective DAA operation.

In another aspect, the processing circuitry 40 is adapted to derive, from the one or more probability distributions of pseudo-range estimates, an estimate of the pseudo-range to the detected, unknown object by selecting a worst case pseudo-range estimate. This can ensure that the object is promptly avoided, erring on the side of caution.

In one aspect, the processing circuitry 40 is adapted to combine the sensor detection data with prior performance models 30 for the sensor by using Bayesian techniques to combine the sensor detection data with a prior probability distribution describing uncertainty in sensor detection as a function of pseudo-range to a detected object. Further, in one aspect, the processing circuitry 40 is adapted to establish a probability distribution of pseudo-range estimates by establishing a Bayesian posterior probability distribution of pseudo-range to an unknown object at the time of initial detection. This leverages known mathematical techniques to generate a pseudo-range estimate.

In one aspect, the processing circuitry 40 is further adapted to receive current atmospheric condition data, and wherein the processing circuitry 40 is adapted to perform one or both of the combining and deriving steps by additionally considering the atmospheric condition data. In one aspect, the processing circuitry 40 is further adapted to access a database of known or likely vehicular activity in a region of the vehicle's spatial and temporal location, and wherein the processing circuitry is adapted to perform one or both of the combining and deriving steps by additionally considering the vehicular activity. The incorporation of additional environmental conditions or activities can improve the accuracy of a pseudo-range estimate.

In one aspect, the processing circuitry 40 is further adapted to update the estimated pseudo-range to the detected, unknown object by using a temporal state estimator to compare a prior pseudo-range estimate to one or more current probability distributions of pseudo-range estimates. In one aspect, the processing circuitry 40 further receives prior closure models 38 of range to detected objects. This can provide an increasingly accurate pseudo-range estimate over time.

In one aspect, the processing circuitry 40 is adapted to establish a probability distribution of pseudo-range estimates for an assumed detected object type and environmental conditions. This increases the range of possible pseudo-range estimates from which to select, and can improve accuracy.

The processing circuitry 40 can comprise any one or more sequential state machines operative to execute machine instructions stored as machine-readable computer programs in the memory 42, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of the above. Although the memory 42 is depicted as being separate from the processing circuitry 40, those of skill in the art understand that the processing circuitry 40 includes internal memory, such as a cache memory or register files. Those of skill in the art additionally understand that virtualization techniques allow some functions nominally executed by the processing circuitry 40 to actually be executed by other hardware, perhaps remotely located (e.g., in the so-called "cloud"). In such aspects, the pseudo-range estimating system 12 (or other vehicle electronics) can additionally include one or more wireless communication interfaces (not shown), such as a cellular or WLAN interface.

The memory 42 can comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The prior performance models 30 and, if present, closure models 38 can be stored in one or more databases or other memory structures, or can be loaded into the connectivity of one or more neural networks by a training operation, as known in the art.

In the aspect depicted in FIG. 3, at least the Bayesian updating process unit 32 and the reasoning process unit 34, depicted in and described with reference to FIG. 1, are implemented as software modules stored in memory 42 and executed by processing circuitry 40. In one aspect, the memory 42 additionally stores, and the processing circuitry 40 additionally executes, the pseudo-range updating process unit 36, which can implement a temporal state estimator, such as a Kalman filter, to provide updated pseudo-range estimates.

Aspects of the present disclosure present numerous advantages over passive ranging systems of the prior art. Aspects are operative to provide an estimate of pseudo-range to a detected object essentially instantaneously after receiving a binary indication of the object's detection. Object data from multiple frames over time is not required. Disparate object views from different sensor positions are not required. No known objects in the vicinity are required. There is no need to resolve discernable features of the detected object, or to make an early characterization/assumption of its size, shape, or the like. No model of deviation from assumed spectral characteristics is required. Aspects of the present disclosure provide a pseudo-range estimate to a detected, unknown object based only on, in one aspect, the detection indication from a passive sensor, the spatial and temporal location of the vehicle, and prior performance models of the sensor. In other aspects, additional information such as atmospheric conditions or known activity can improve the accuracy of the pseudo-range estimate. Because only a single, passive sensor and electronic circuitry are required, a pseudo-range estimating system according to aspects of the present disclosure minimizes weight, drag, complexity, and power consumption of an autonomous vehicle, such as a light aircraft. This conserves capacity for useful payload, and extends the range of the autonomous light aircraft, as compared to prior art passive object detection systems. The pseudo-range estimate generated, while known to be of limited accuracy, is sufficiently accurate to provide an early, useful rough estimate of LoS range to an object for a DAA system 10 to assess the situation, and potentially initiate early avoidance procedures.

Although aspects of the present disclosure are discussed herein are primarily with reference to autonomous aircraft operation, those of skill in the art will readily recognize that all such aspects are fully applicable to many applications of the autonomous operation of vehicles, and are not limited to aircraft.

The present disclosure can, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced herein.

What is claimed is:

1. A method, performed by an apparatus, of estimating a pseudo-range to a detected, unknown object from a vehicle having a passive sensor, comprising:
   receiving, from the passive sensor, a single binary indication of an object;
   based on the single binary indication, establishing one or more probability distributions of pseudo-range estimates by using Bayesian techniques to combine prior testing data of the passive sensor at a range from the passive sensor to the object;
   deriving, from the one or more probability distributions of pseudo-range estimates, the estimate of the pseudo-range to the detected, unknown object; and
   outputting, to the apparatus, the estimated pseudo-range to the detected, unknown object.

2. The method of claim 1, wherein deriving, from the one or more probability distributions of pseudo-range estimates, the estimate of the pseudo-range to the detected, unknown object comprises selecting a pseudo-range estimate with a high probability of being correct.

3. The method of claim 1, wherein deriving, from the one or more probability distributions of pseudo-range estimates, the estimate of the pseudo-range to the detected, unknown object comprises selecting a worst case pseudo-range estimate.

4. The method of claim 1, wherein establishing the probability distribution of pseudo-range estimates comprises establishing a Bayesian posterior probability distribution of pseudo-range to an unknown object at a time of initial detection.

5. The method of claim 1 further comprising:
   updating the estimated pseudo-range to the detected, unknown object by using a temporal state estimator to compare a prior pseudo-range estimate to one or more current probability distributions of pseudo-range estimates.

6. The method of claim 5, wherein the temporal state estimator further receives prior closure models of range to detected objects.

7. The method of claim 1, wherein the probability distribution of pseudo-range estimates is established for an assumed detected object type and environmental conditions.

8. A pseudo-range estimating apparatus adapted to estimate a pseudo-range to a detected, unknown object from a vehicle having a passive sensor, comprising:
   stored prior performance models for the passive sensor;
   memory; and
   processing circuitry operatively connected to the memory and operative to receive the stored prior performance models, the processing circuitry adapted to
   receive, from the passive sensor, a single binary indication of an object;
   based on the single binary indication, establish one or more probability distributions of pseudo-range estimates by using Bayesian techniques to combine prior testing data of the passive sensor at a range from the passive sensor to the object;
   derive, from the one or more probability distributions of pseudo-range estimates, the estimate of the pseudo-range to the detected, unknown object; and
   output the estimated pseudo-range to the detected, unknown object.

9. The apparatus of claim 8, wherein the processing circuitry is adapted to derive, from the one or more probability distributions of pseudo-range estimates, the estimate of the pseudo-range to the detected, unknown object by selecting a pseudo-range estimate with a high probability of being correct.

10. The apparatus of claim 8, wherein the processing circuitry is adapted to derive, from the one or more probability distributions of pseudo-range estimates, the estimate of the pseudo-range to the detected, unknown object by selecting a worst case pseudo-range estimate.

11. The apparatus of claim 8, wherein the processing circuitry is adapted to combine the sensor detection data with the stored prior performance models for the passive sensor by using Bayesian techniques to combine the sensor detection data with a prior probability distribution describing uncertainty in sensor detection as a function of pseudo-range to a detected object.

12. The apparatus of claim 8, wherein the processing circuitry is further adapted to access a database of known or likely vehicular activity in a region of the vehicle's spatial and temporal location, and wherein the processing circuitry is adapted to perform one or both of the combining and deriving steps by additionally considering the vehicular activity.

13. The apparatus of claim 8, wherein the processing circuitry is further adapted to update the estimated pseudo-range to the detected, unknown object by using a temporal state estimator to compare a prior pseudo-range estimate to one or more current probability distributions of pseudo-range estimates.

14. The apparatus of claim 13, wherein the processing circuitry further receives prior closure models of range to detected objects.

15. The apparatus of claim 8, wherein the processing circuitry is adapted to establish the probability distribution of pseudo-range estimates for an assumed detected object type and environmental conditions.

16. The method of claim 1, further comprising factoring known vehicular activity in the region of the vehicle's location at the time of detection of the object and establishing the one or more probability distributions of the pseudo-range estimates.

17. The method of claim 1, further comprising tracking a bearing to the object over time and assessing a threat of collision or interference with the object.

18. The method of claim 1, further comprising deriving an object type of the object based on the estimated pseudo-range.

19. The method of claim 1, further comprising determining an estimate of a location of the object in a navigation coordinate frame based on an own-aircraft position and the estimated pseudo-range.

20. The apparatus of claim 8, wherein the processing circuitry is further adapted to factor known vehicular activity in the region of the vehicle's location at the time of detection of the object to establish the one or more probability distributions of the pseudo-range estimates.

* * * * *